(12) United States Patent
Davis (10) Patent No.: US 7,131,432 B2
(45) Date of Patent: Nov. 7, 2006

(54) NATURAL GAS ENGINE SUPPLY METHOD AND APPARATUS

(76) Inventor: Jeff Davis, P.O. Box 509, La Plata, NM (US) 87418

( * ) Notice: Subject to any disclaimer, the term of this patent is extended or adjusted under 35 U.S.C. 154(b) by 80 days.

(21) Appl. No.: 10/799,953

(22) Filed: Mar. 11, 2004

(65) Prior Publication Data
US 2005/0199225 A1 Sep. 15, 2005

(51) Int. Cl.
*F02G 5/00* (2006.01)

(52) U.S. Cl. .............................. 123/557; 123/DIG. 13

(58) Field of Classification Search ................ 123/557, 123/DIG. 13
See application file for complete search history.

(56) References Cited

U.S. PATENT DOCUMENTS

| | | | |
|---|---|---|---|
| 4,086,892 A * | 5/1978 | Marsee | 123/547 |
| 4,811,720 A * | 3/1989 | Katumata et al. | 123/527 |
| 5,483,943 A * | 1/1996 | Peters | 123/527 |
| 5,794,601 A * | 8/1998 | Pantone | 123/538 |
| 6,044,825 A * | 4/2000 | Carter et al. | 123/557 |
| 6,345,611 B1 * | 2/2002 | Hartman et al. | 123/553 |
| 6,557,535 B1 * | 5/2003 | Stone | 123/527 |

* cited by examiner

*Primary Examiner*—Marguerite McMahon
(74) *Attorney, Agent, or Firm*—V. Gerald Grafe (57) ABSTRACT

A method and apparatus providing for efficient operation of gas engines in non-ideal temperature conditions. An apparatus is provided in fluid communication with a source of gas, and with the gas input of a gas engine. The apparatus accepts gas from the source, and allows the gas to reach the gas engine via one or two reservoirs. Pressure regulators can be mounted with the input ports, output ports, or combinations thereof, of the reservoirs. An exhaust channel accepts exhaust from the gas engine and passes it along a path that is in thermal communication with the reservoirs, such that the exhaust encourages a more uniform and higher operating temperature of the gas supplied to the pressure regulators and to the gas engine.

20 Claims, 5 Drawing Sheets

NATURAL GAS ENGINE SUPPLY METHOD AND APPARATUS

BACKGROUND OF THE INVENTION

This invention relates to the field of gas engines, specifically to methods and apparatuses for supplying natural gas to natural gas engines in environments characterized by low temperatures.

Natural Gas Reciprocating Engines are a common site in the oil field. With the easily accessible fuel source of natural gas it becomes quick and easy to convert that gas source to engine horsepower. Applications range from gas compressors, to power generation to pumps . . . and more. Natural Gas Engines will continue to be a major and increasing source of driver horsepower in the oil and gas industry. There are many engines manufactured in the 40's and 50's still in operation today.

Technical improvements over the years have provided smaller/higher horsepower engines. In the past a 5000 hp unit was available only in large bore—low speed engines. A typical engine of this horsepower would be around 40 feet long 8 feet wide and required a major construction project to install. Once installed the engine had to remain right where it was because of the cost to remove it. Today the same or greater horsepower engine is available in a much smaller and more portable package. The move to the conversion of diesel engines to natural gas engines constitutes most of the innovative technology today. The older low speed engines mentioned above were actually conversions of diesels themselves but were extensively re-engineered.

Figure 1:
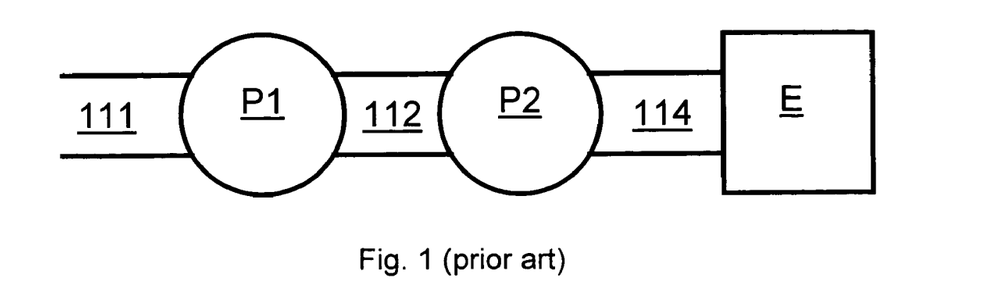
FIG. 1 is a schematic representation of a prior art gas supply apparatus.

Natural gas engines typically rely on a steady flow of natural gas for efficient and continued operation. The gas supply typically must be reduced from wellhead pressure to an engine-usable pressure of just a few ounces. Further, gas supply direct from the wellhead typically comprises hydrocarbons and hydrates, and, in low temperatures, is subject to condensation, which can interrupt operation of the engine. Further, the pressure differentials across the pressure regulator (often, two separate regulators) can encourage condensation. FIG. 1 is a schematic illustration of current gas supply systems. A wellhead natural gas source supplies gas 111 to a first pressure regulator P1. The first pressure regulator P1 supplied a regulated pressure 112 to a second pressure regulator P2. The second pressure regulator P2 supplies an ounce-level pressure 114 of natural gas to a gas engine E. Exhaust from the engine E is typically exhausted into the surrounding air. In low temperatures, condensation anywhere in the system can interrupt operation of the engine. The gas supply is especially prone to condensation at the pressure regulators P1, P2. There is a need for methods and apparatuses for supplying gas to gas engines that reduce the likelihood of condensation and the consequent interruption of operation of the engine.

SUMMARY OF THE INVENTION

The present invention comprises an apparatus suitable for supplying gas to a gas engine, in a manner that discourages undesirable effects of condensation, freezing and thermal differentials in the gas supply. The apparatus can comprise one or two reservoirs, through which gas flows on its way to the engine. The apparatus is suitable for use as a volume pot. A pressure regulator can be connected between the two reservoirs, such that gas from a first reservoir is regulated before flowing into a second reservoir. The output of the second reservoir can be routed to an input of a gas engine. Exhaust from a gas engine can be through an exhaust channel so that thermal energy is transferred from the exhaust to the gas in the two reservoirs. The gas in the two reservoirs can thereby be heated and be urged toward a uniform temperature, reducing the problems associated with condensation, freezing and the likelihood of freezing at the pressure differentials about the pressure regulator.

Various configurations and fabrication methods are disclosed. In one example embodiment, commonly-available 4 inch tubing can be used for the reservoirs, capped with standard 4½ inch end caps welded on. Ports for gas communication with the reservoirs can comprise threaded flanges welded about holes pierced in the tubing. Drain ports can be added near the bottom of the reservoirs to foster convenient draining of contaminants from the gas supply. A commonly-available 2⅜ inch tubing can be used for an exhaust channel, and welded between the two reservoirs.

A pressure regulator can mount between ports on the two reservoirs. A flexible tube can be used to connect the exhaust tube to a gas engine. A pressure regulator can also be connected between a wellhead gas supply and a first reservoir. The reservoirs and exhaust tube can be welded to a suitable support structure, for example to steel angle used as legs and to a steel base plate.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIGS. 4(*a,b,c,d,e,f,g*) comprise schematic illustrations of various example exhaust channel and reservoir configurations.

DETAILED DESCRIPTION OF THE INVENTION

The present invention comprises methods and apparatuses providing for efficient operation of gas engines in non-ideal temperature conditions. An apparatus is provided in fluid communication with a source of gas, and with the gas input of a gas engine. The apparatus accepts gas from the source, and allows the gas to reach the gas engine via two reservoirs.

Pressure regulators can be mounted with the input ports, output ports, or combinations thereof, of the reservoirs. An exhaust channel accepts exhaust from the gas engine and passes it along a path that is in thermal communication with the reservoirs, such that the exhaust encourages a more uniform and higher operating temperature of the gas supplied to the pressure regulators and to the gas engine.

Figure 2:
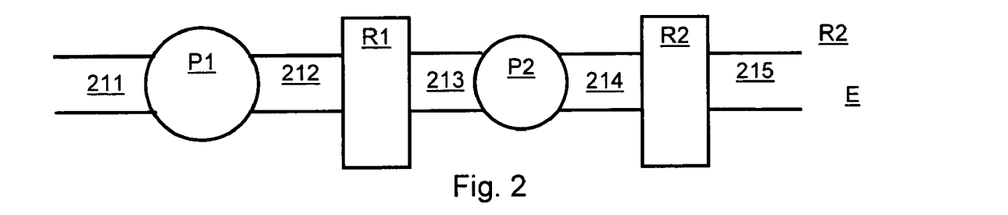
FIG. 2 is a schematic representation of an apparatus according to the present invention.

FIG. 2 is a schematic representation of an apparatus according to the present invention. The apparatus comprises first P1 and second P2 pressure regulators, and first R1 and second R2 reservoirs. The apparatus is adapted for use with a gas engine E. First pressure regulator P1 mounts with first reservoir R1 such that the two are in fluid communication, where "fluid communication" includes mountings that allow fluid (including gas) to transit from one member or volume to another. The first pressure regulator P1 is adapted to connect in fluid communication with a supply of gas, using, as examples, connection methods and standards known to those skilled in the art. The second pressure regulator P2 mounts with the first R1 and second R2 reservoirs such that the second pressure regulator P2 is in fluid communication with both reservoirs. The second reservoir R2 is adapted to connect in fluid communication with a gas intake of a gas engine, using, as examples, connection methods and standards appropriate to the engine and known to those skilled in the art. An exhaust channel X1 mounts with the two reservoirs such that it is in thermal communication with them, where "thermal communication" includes any mounting such that thermal energy can transfer from the exhaust channel X1 to the first R1 and second R2 reservoirs. The exhaust channel X1 is adapted to connect in fluid communication with an exhaust output of a gas engine using, as examples, connection methods and standards appropriate to the engine and known to those skilled in the art. Note that either of the reservoirs R1, R2 can be omitted; the heat transfer of the system might be reduced, but the resulting single reservoir system will still be advantageous to the operation of the gas engine system.

In operation, a gas source supply gas to the input of the first pressure regulator P1. For example, the gas source can comprise a well-head connection with the gas supply at well-head pressure 211. The first pressure regulator P1 regulates the pressure from the substantially uncontrolled well-head pressure (example well-head pressures can range from 1 to 1000 psi). The output 212 of the first pressure regulator P1 can supply gas to the first reservoir R1. Gas in the interior volume of the first reservoir is substantially at the regulated pressure output of the first pressure regulator P1. Gas in the first reservoir R1 is encouraged to an operating temperature by thermal communication 221 with warm exhaust 216 in the exhaust channel X1. An output 213 of the first reservoir R1 can supply gas to the input of the second pressure regulator P2.

The second pressure regulator P2 can regulate the pressure output 213 from the first reservoir R1, for example by reducing the pressure to a range suitable for input to a gas engine (example gas engine input pressures can range from 8 to 16 ounces per square inch). The output 214 of the second pressure regulator P2 can supply gas to the second reservoir R2. Gas in the interior volume of the second reservoir R2 is substantially at the regulated pressure output of the second pressure regulator P2. Gas in the second reservoir R2 is encouraged to an operating temperature by thermal communication with warm exhaust 216 in the exhaust channel X1. An output 215 of the second reservoir R2 can supply gas to an input of a gas engine. Exhaust 216 from the gas engine can be supplied to the exhaust channel X1.

Since the two reservoirs R1, R2 are in thermal communication with exhaust 216 at substantially the same temperature, the gas in the reservoirs is encouraged to operating temperatures that are substantially the same. The temperature drops common in the prior art that can lead to condensation, freezing and undesirable engine performance can therefore be avoided by the present invention. The thermal transfer from the heated exhaust can also increase the temperature of the gas in both reservoirs above ambient, since the exhaust temperature is typically above the ambient temperature. The heating of the gas in the reservoirs can also help avoid the problems associated with condensation, freezing and undesirable engine performance.

Figure 3:
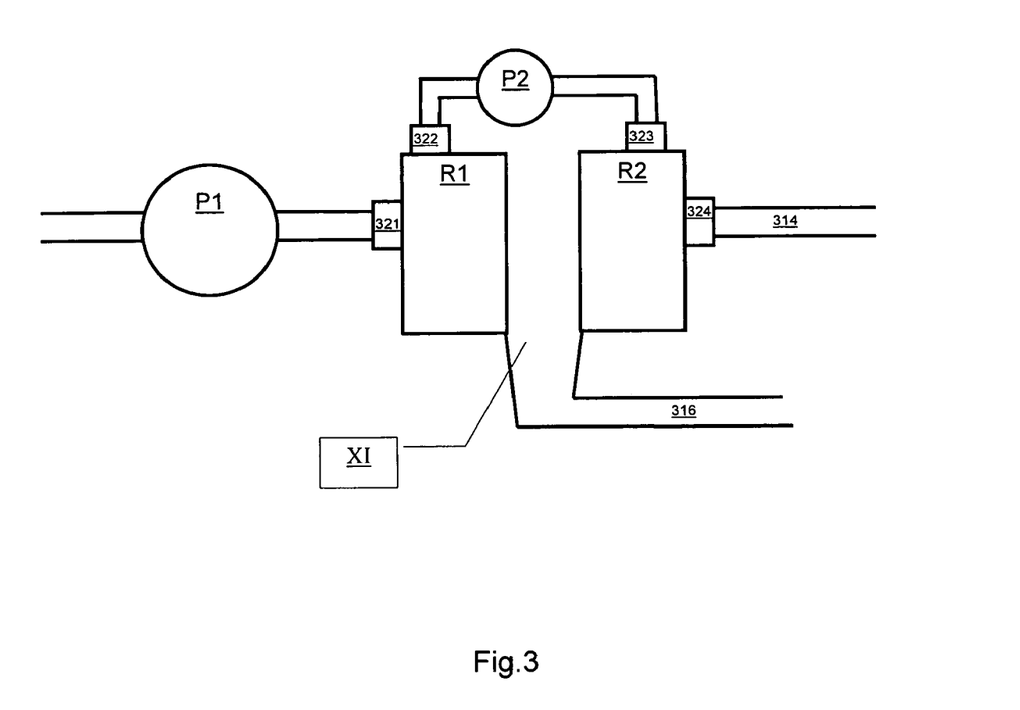
FIG. 3 is a schematic illustration of an apparatus according to the present invention.

FIG. 3 is a schematic illustration of an apparatus according to the present invention. The top of the illustration corresponds to an upward direction in an actual apparatus according to the figure. The input of a first pressure regulator P1 is adapted to connect with a gas supply 311. The output of the first regulator P2 connects with an input port 321 of the first reservoir R1, at a distance from the bottom the first reservoir R1. The first reservoir R1 can have an output port 322 mounted at a distance from the bottom of the first reservoir R1, shown in the figure as at the top of the first reservoir R1. The output port 322 can connect with the input of a second pressure regulator P2. The output of the second pressure regulator P2 can connect with an input port 323 of a second reservoir R2, at a distance from the bottom of the second reservoir R2, shown in the figure as at the top of the second reservoir R2. The second reservoir can have an output port 324, mounted at a distance from the bottom of the second reservoir R2. Configuring the various ports so that they are at distances from the bottom of the corresponding reservoirs can encourage contaminants to remain near the bottom of the reservoirs R1, R2 instead of interfering with operation of the apparatus or a connected engine. A space between the two reservoirs R1, R2 can be configured to form an exhaust channel X1, for example by using parts of the reservoirs as boundaries for the exhaust channel X1, or by mounting a passageway (such as a tube) in contact with the reservoirs R1, R2. The exhaust channel X1 can be configured to connect with an exhaust from a gas engine 316, allowing thermal communication and reduced temperature differentials in a similar manner as discussed elsewhere herein.

FIGS. 4(a,b,c,d,e,f,g) comprise schematic illustrations of various example exhaust channel and reservoir configurations. Each of the subject figures comprises a cross-section through a portion of the reservoirs and exhaust channel where thermal communication is encouraged. An apparatus according to the present invention does not need to maintain a uniform cross-section, and the various cross-sections can be combined or varied in manners suited for the thermal communication desired and other characteristics desired for the resulting system. Suitable cross-sections, including those shown in the figures, can be obtained using a variety of fabrication methods known to those skilled in the art. As examples, suitable cross-sections can be extruded, and appropriate end terminations added. As another example, readily available square or round tubing and sheet material can be combined using welding or other suitable fabrication techniques.

Figure 4A:
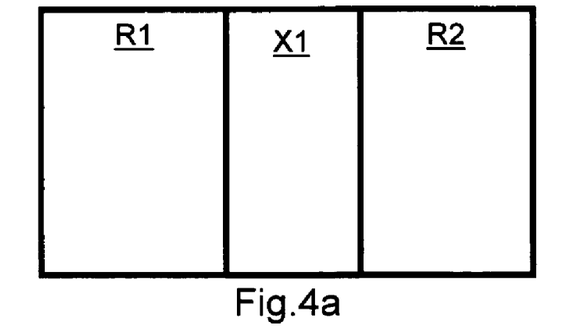

In FIG. 4a, first R1 and second R2 reservoirs comprise substantially rectangular cross-sections. Exhaust channel X1 also comprises a substantially rectangular cross-section, having a wall in common with each of the first R1 and second R2 reservoirs. The common walls can provide desired thermal communication.

Figure 4B:
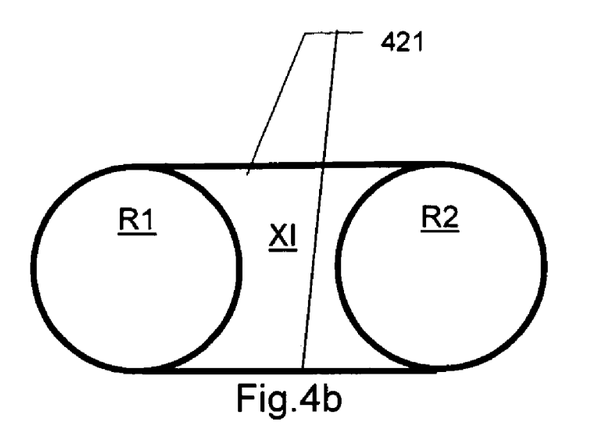

In FIG. 4b, first R1 and second R2 reservoirs comprise substantially circular cross-sections, such as can be readily obtained using common tubing or pipe. An exhaust channel X1 can comprise an area between the two reservoirs R1, R2, defined by two external walls 421 and portions of the walls of the two reservoirs R1, R2. The portions of the reservoir walls common to the reservoirs and the exhaust channel can provide desired thermal communication.

Figure 4C:
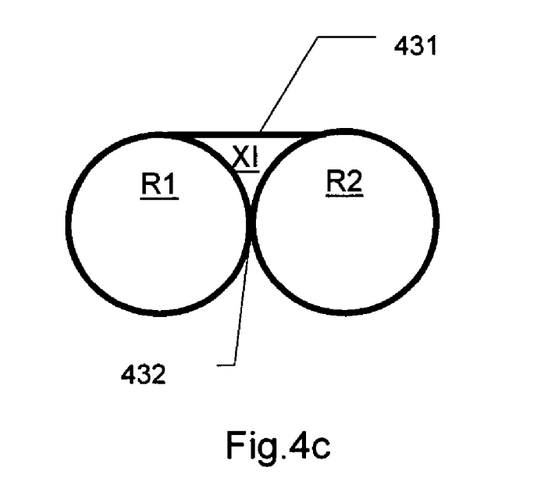

In FIG. 4c, first R1 and second R2 reservoirs comprise substantially circular cross-sections. The reservoirs can be sealingly connected at a point 324 along the circumference of their cross-section. An exhaust channel X1 can be formed by an additional wall 431 sealingly connected with the two reservoirs, enclosing an area defined by portions of the circumferences of the reservoirs R1, R2 and the additional wall 431. The portions of the circumferences common to the reservoirs R1, R2 and the exhaust channel X1 can provide desired thermal communication.

Figure 4D:
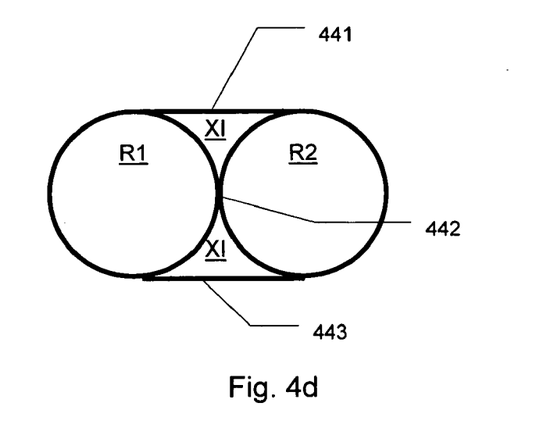

FIG. 4d illustrates a similar cross-section as FIG. 4c, with the addition of a second wall 443, sealingly mounted with the two reservoirs R1, R2 roughly opposite a first wall 441. The two walls 441, 443, and the connection 442 between the reservoirs R1, R2 define an exhaust channel X1 having two areas. The two areas can provide for increased flow, increased thermal communication. The two areas can also be treated as redundant channels, allowing for, as examples, connection to multiple exhaust sources or fault tolerance in the event one area becomes inoperative.

Figure 4E:
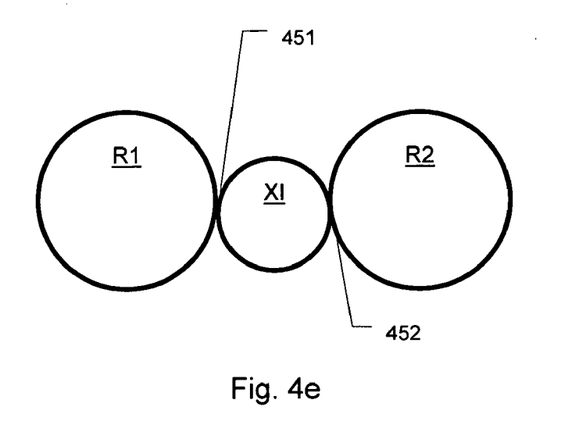

In FIG. 4e, first R1 and second R2 reservoirs comprise substantially circular cross-sections. An exhaust channel X1 also comprises a substantially circular cross-section. The reservoirs and exhaust channel can be connected at points 451, 452 along their circumferences. If the exhaust channel X1 is formed of a sealed tube, then the connection with the reservoirs R1, R2 need not seal, possibly easing fabrication. The physical proximity of the exhaust channel X1 and the reservoirs R1, R2 can provide desired thermal communication. Thermal communication can be enhanced by the method of connection, for example by welded connections between metal reservoir tubes and a metal exhaust channel tube.

Figure 4F:
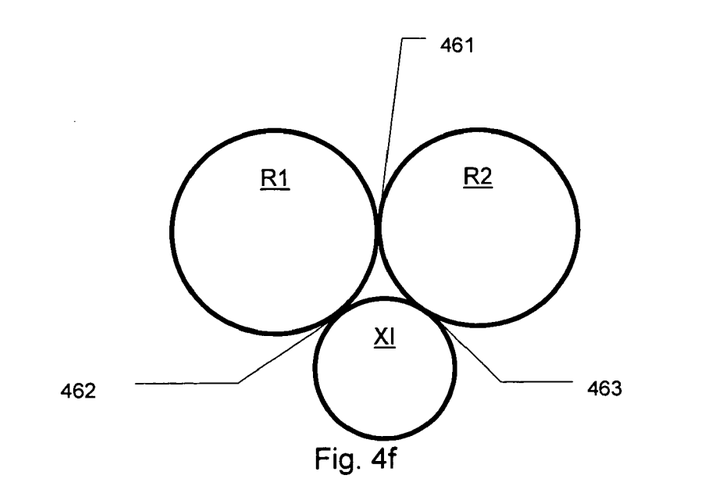

In FIG. 4f, first R1 and second R2 reservoirs comprise substantially circular cross-sections. An exhaust channel X1 also comprises a substantially circular cross-section. The reservoirs R1, R1 can be connected at a point 461 along their circumferences. The exhaust channel can be connected to the reservoirs at points 462, 463 along their circumferences. If the exhaust channel X1 is formed of a sealed tube, then the connection with the reservoirs R1, R2 need not seal, possibly easing fabrication. The physical proximity of the exhaust channel X1 and the reservoirs R1, R2 can provide desired thermal communication. Thermal communication can be enhanced by the method of connection, for example by welded connections between metal reservoir tubes and a metal exhaust channel tube. The connection between the reservoirs R1, R2 can also provide for thermal communication between the reservoirs, further decreasing undesirable temperature differentials. A second exhaust channel (not shown) can be added to the example of the figure, substantially opposite the first channel, to provide multiple channels as discussed elsewhere herein.

Figure 4G:
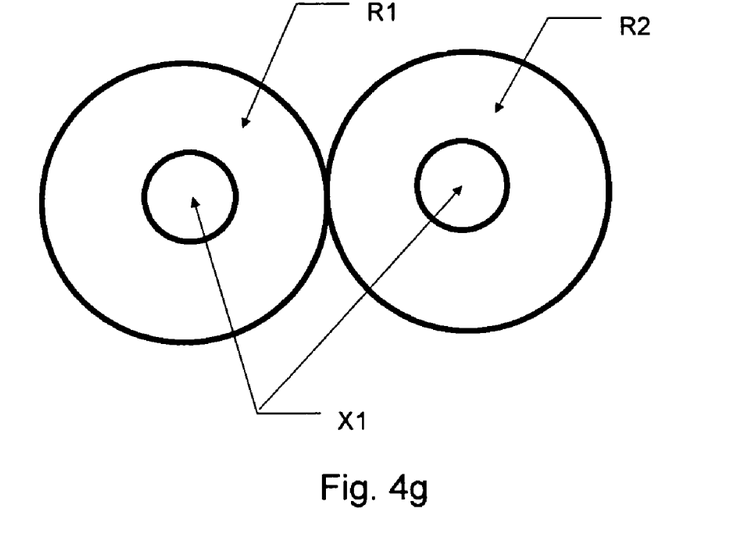

In FIG. 4g, first R1 and second R2 reservoirs comprise substantially circular cross-sections. An exhaust channel X1 comprises two areas defined by substantially circular cross-sections, mounted within the circular cross-sections of the reservoirs R1, R2. Each portion of the exhaust channel X1 accordingly has its entire circumference in contact with gas in a reservoir, providing desired thermal communication.

Figure 5:
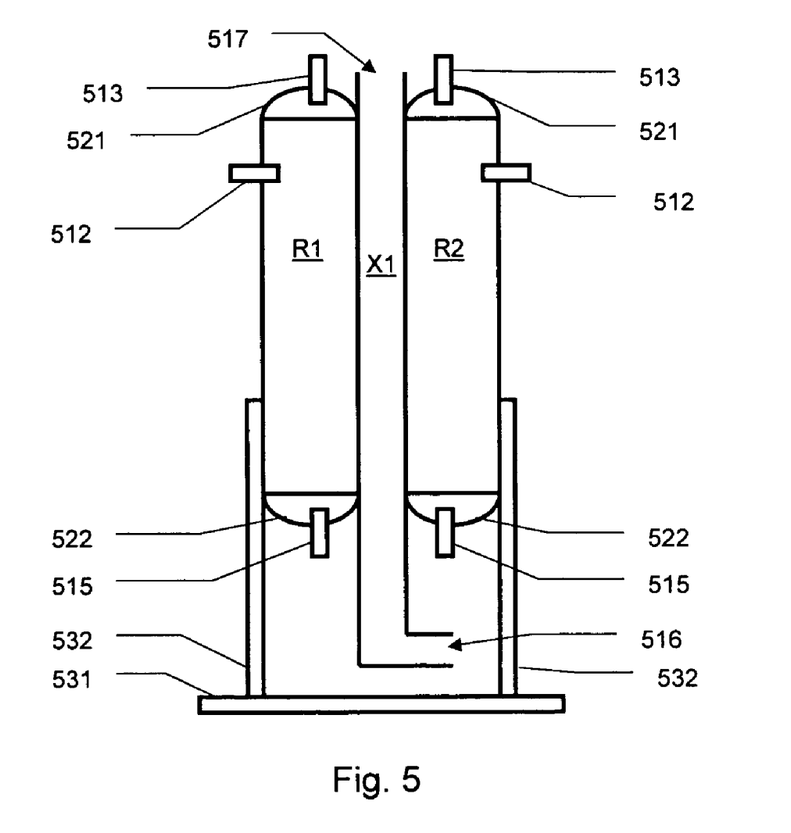
FIG. 5 is a schematic illustration of an apparatus according to the present invention.

FIG. 5 is a schematic illustration of an apparatus according to the present invention.

The apparatus comprises first R1 and second R2 reservoirs, each of which can comprise a substantially cylindrical shape. Suitable cylindrical shapes can be obtained using available tubing or pipe, for example 4 inch diameter, 1200 psig steel tubing can be suitable. The tubing can be of a length suitable for the desired performance; for some applications a length of approximately 36 inches can be suitable. The ends of the tubing can be closed with, for examples, 4½ inch, 3000 psig end caps 521, 522 welded to the tubing.

Each reservoir R1, R2 can have a port 512 mounted with the side of the reservoir, spaced away from an end of the reservoir that will down when the reservoir is mounted. The ports 512 can comprise, for example, a well cap with a threaded 1 inch coupler, welded to the reservoir about a hole pierced in the reservoir wall. Each reservoir R1, R2 can further have a port 513 mounted with the top of the reservoir R1, R2, for example a well cap with a threaded 1 inch coupler welded to the corresponding end cap 521 about a hole pierced through the end cap. Each reservoir R1, R2 can further have a port 515 mounted near the bottom of the reservoir R1, R2, for example a a well cap with a threaded 1 inch coupler welded to the corresponding end cap about a hole pierced through the end cap. The threaded flanges, or other port structures, can be configured such that they are suitable for mounting with standard gas connections or standard valve plumbing connections.

Each reservoir R1, R2 can have a support 532 mounted with the reservoir R1, R2, adapted to securely maintain the reservoir in a selected position relative to a base 531. For example, 2 inch angle steel can be welded to each reservoir, and welded to a steel base plate, of length and in number sufficient for the rigidity required of the particular application. A ¼ in thick by 16 inches square steel base plate can be suitable for some applications.

An exhaust channel X1 can comprise a cylindrical cross-section. A suitable cylindrical shape can be obtained using available tubing or pipe, for example 2⅜ inch diameter, steel tubing can be suitable. The tubing can be of a length suitable for the desired performance; for some applications a length of approximately 40 inches can be suitable. The tubing can be welded to the reservoirs R1, R2, for support of the tubing and for desired thermal communication. The welded connection can be the full length of the reservoir or exhaust tubing, or can be in such other configurations as provide adequate support and thermal communication. A first end 516 of the tubing can be configured to connect with an exhaust outlet of a gas engine; for example, the first end 516 can be of a size and finish to mount with a flexible tube that can be routed from an exhaust outlet of a gas engine. A second end 517 of the tubing can be left open to the air, or can be configured to connect with other components such as exhaust vanes.

In operation, a source of gas can be connected through a pressure regulator to the side port 512 of the first reservoir R1. A second pressure regulator, for example an ounce regulator (is that the right term?), can be connected between the top ports 513 of the two reservoirs R1, R2. the side port 512 of the second reservoir R2 can be connected to a gas input of a gas engine. The first end 516 of the exhaust channel can be connected, for example, to a flexible tubing that connects with an exhaust outlet of the gas engine. The bottom ports 522 of the two reservoirs R1, R2 can be sealed, and unsealed if it becomes necessary to drain contaminants from the reservoirs R1, R2. Alternatively, drain valves can be connected to the bottom ports 522 of the reservoirs R1, R2 to allow more convenient draining.

Figure 6:
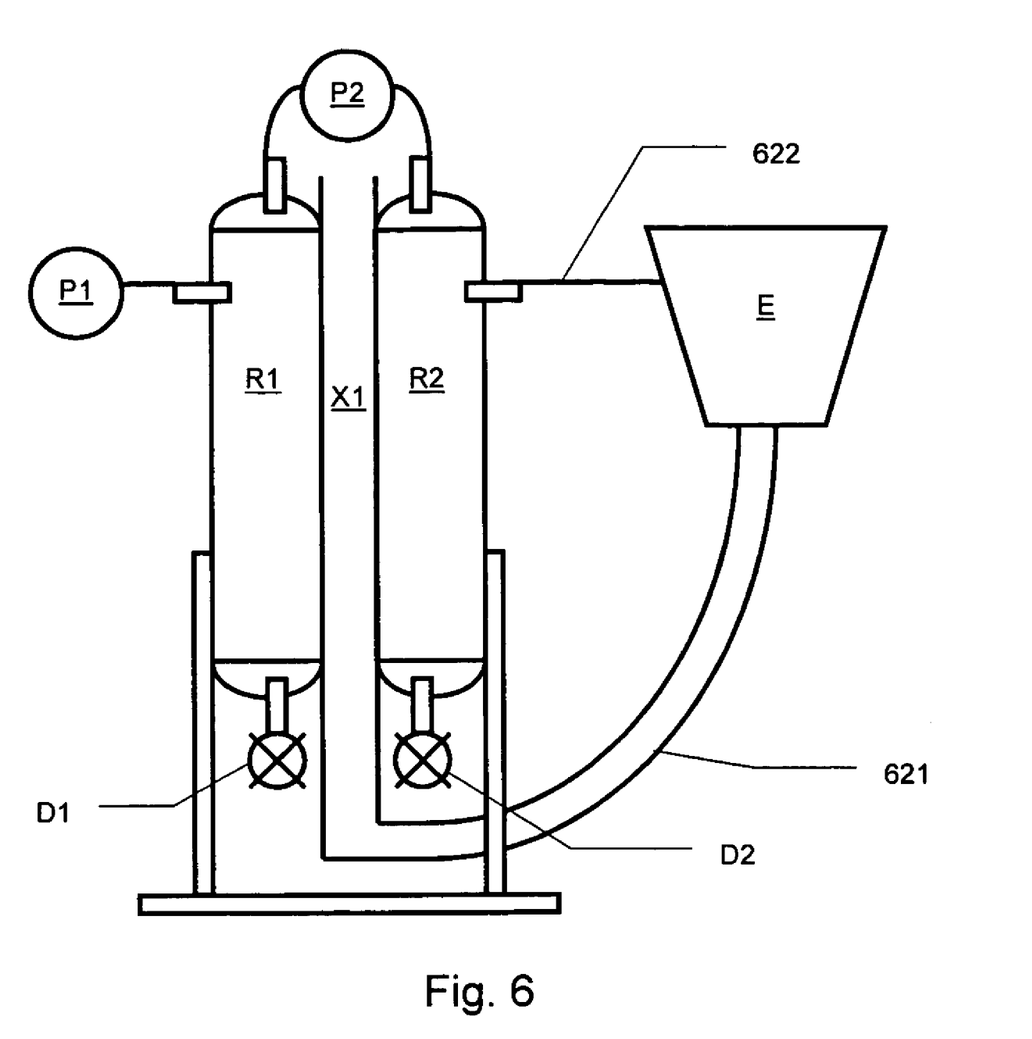
FIG. 6 is a schematic illustration of an apparatus according to the present invention.

FIG. 6 is a schematic illustration of an apparatus according to the present invention. The reservoirs, exhaust channel, and ports can be configured as previously described. The pressure regulators described in the operation of the previous illustration can mount as part of the apparatus, as shown in the figure. Also, the drain valves discussed in the operation of the previous illustration can mount as part of the apparatus, as shown in the figure. Also, the flexible tube used to route exhaust to the exhaust channel can mount as part of the apparatus, as shown in the figure. Also, the connection to the input of a gas engine can mount as part of the apparatus, as shown in the figure.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

I claim:

1. A gas engine supply apparatus, comprising:
   a) a first reservoir, defining an enclosure suited for containing gas, and having an input port adapted to connect to a supply of gas, and an output port, wherein the first reservoir further comprises a drain device, capable of a first state wherein the drain device is substantially sealed, and a second state wherein the drain device allows material from the first reservoir to exit therefrom;
   b) a second reservoir, defining an enclosure suited for containing gas, and having an input port in communication with the output port of the first reservoir, and an output port; and
   c) an exhaust channel, adapted to receive exhaust from a gas engine and mounted with the first and second reservoirs such that the exhaust channel is in thermal communication with the first and second reservoirs.

2. An apparatus as in claim 1, wherein the exhaust channel comprises:
   a) a first port adapted to receive exhaust from a natural gas engine;
   b) a second port adapted to allow exhaust to exit the exhaust channel; and
   c) a path from the first port to the second port, where exhaust along a portion of the path is in thermal communication with the first and second reservoirs.

3. An apparatus as in claim 2, wherein the exhaust channel along the portion of the path is in physical contact with the first and second reservoirs.

4. An apparatus as in claim 2, wherein the first port comprises a flexible hose adapted to mount with and receive exhaust from an exhaust outlet of a gas engine.

5. An apparatus as in claim 1, wherein the first reservoir comprises a cylinder.

6. An apparatus as in claim 1, wherein the input port of the first reservoir comprises a pressure regulator adapted to connect to a supply of gas at an unregulated input port and connected to the first reservoir at a regulated output port.

7. An apparatus as in claim 1, wherein the output port of the first reservoir comprises a pressure regulator adapted to connect to the first reservoir at an unregulated input port and connected to the second reservoir at a regulated output port.

8. An apparatus as in claim 1, wherein the second reservoir comprises a cylinder.

9. An apparatus as in claim 1, wherein the output port of the second reservoir is adapted to connect with a gas input port of a gas engine.

10. An apparatus as in claim 1 wherein:
    a) the first reservoir comprises a first cylinder;
    b) the second reservoir comprises a second cylinder;
    c) the exhaust channel comprises a cylinder in physical contact with the first and second cylinders.

11. An apparatus as in claim 1 wherein:
    a) the first reservoir comprises a first cylinder;
    b) the second reservoir comprises a second cylinder;
    c) the exhaust channel comprises a surface, mounted with the first and second cylinders such that the first cylinder, second cylinder, and surface together define a path.

12. An apparatus as in claim 1, wherein:
    a) the first reservoir comprises a first cylinder;
    b) the input port of the first reservoir comprises a pressure regulator adapted to connect to a supply of gas at an unregulated input port and connected to the first reservoir at a regulated output port;
    c) the second reservoir comprises a second cylinder;
    d) the second reservoir further comprises a second drain device, capable of a first state wherein the second drain device is substantially sealed, and a second state wherein the second drain device allows material from the second reservoir the exit therefrom;
    e) the output port of the first reservoir comprises a pressure regulator adapted to connect to the first reservoir at an unregulated input port and connected to the second reservoir at a regulated output port;
    f) the output port of the second reservoir is adapted to connect with a gas input of a gas engine; and
    g) the exhaust channel along the portion of the path is in physical contact with the first and second cylinders.

13. An apparatus as in claim 1, wherein the exhaust channel is in physical contact with the first and second reservoirs.

14. A gas engine supply apparatus, comprising:
    a) a first reservoir, defining an enclosure suited for containing gas, and having an input port adapted to connect to a supply of gas, and an output port;
    b) a second reservoir, defining an enclosure suited for containing gas, and having an input port in communication with the output port of the first reservoir, and an output port, wherein the second reservoir further comprises a drain device, capable of a first state wherein the drain device is substantially sealed, and a second state wherein the drain device allows material from the second reservoir to exit therefrom; and
    an exhaust channel, adapted to receive exhaust from a gas engine and mounted with the first and second reservoirs such that the exhaust channel is in thermal communication with the first and second reservoirs.

15. An apparatus as in claim 1, wherein the exhaust channel is in physical contact with the first and second reservoirs.

16. An apparatus for supply of gas to a gas engine, comprising:
    a) First and second reservoirs, each comprising:
    i) A cylinder;
    ii) First and second caps, sealingly mounted with first and second ends of the cylinder;
    iii) A drain device mounted with the second end of the cylinder;
    iv) A gas input port mounted with the cylinder at a distance from the second end of the cylinder and allowing fluid communication through the gas input port with the interior volume of the cylinder;
    v) A gas output port mounted with the cylinder at a distance from the second end of the cylinder and allowing fluid communication through the gas output port with the interior volume of the cylinder;

b) A pressure regulator mounted with the first and second reservoirs in fluid communication with the gas output port of the first reservoir and the gas input port of the second reservoir;

c) An exhaust channel, comprising a cylinder mounted in physical contact with the first and second reservoirs, and defining an exhaust input port adapted to connect with a gas exhaust of a gas engine, and defining an exhaust output port adapted to allow fluid communication through the exhaust output port with the interior volume of the exhaust channel.

17. A gas engine system, comprising:

a) an apparatus for supply of gas as in claim 16;

b) a gas engine, having an input port in communication with the gas output port of the second reservoir, and an exhaust port in fluid communication with the exhaust channel of the apparatus for supply of gas.

18. A method of operating a gas engine, comprising:

a) supplying gas to an apparatus for supply of gas as in claim 16, b) supplying gas from the apparatus for supply of gas to the gas engine;

c) supplying exhaust from gas engine to the exhaust channel of the apparatus for supply of gas.

19. An apparatus as in claim 16, wherein each reservoir cylinder is approximately 4 inches in diameter by approximately 36 inches in length, and wherein the first and second reservoirs are welded to the exhaust channel.

20. A gas engine supply apparatus, comprising:

a) first reservoir means for storing gas;

b) second reservoir means for storing gas;

c) means for accepting gas from a supply into the first reservoir means;

d) means for communicating gas from the first reservoir means to the second reservoir means in a pressure-regulated manner;

e) means for communicating gas from the second reservoir means to a gas input of a gas engine;

f) means for communicating thermal energy from exhaust of a gas engine to gas in the first and second reservoir means, g) wherein at least one of the first and second reservoir means further comprises a drain device, capable of a first state wherein the drain device is substantially sealed, and a second state wherein the drain device allows material from the reservoir to exit therefrom.

* * * * *